United States Patent [19]

Mizushima et al.

[11] Patent Number: 5,068,815

[45] Date of Patent: Nov. 26, 1991

[54] OPTICAL FULL ADDER

[75] Inventors: Yoshihiko Mizushima; Kazutoshi Nakajima; Toru Hirohata; Takashi Iida; Yoshihisa Warashina; Kenichi Sugimoto; Tomoko Suzuki; Hirofumi Kan, all of Shizuoka, Japan

[73] Assignee: Hamamatsu Photonics K.K., Shizuoka, Japan

[21] Appl. No.: 541,309

[22] Filed: Jun. 21, 1990

[30] Foreign Application Priority Data

Jun. 23, 1989 [JP] Japan .................................. 1-161913

[51] Int. Cl.$^5$ ............................ G06F 1/04; G06F 7/50
[52] U.S. Cl. ...................................... 364/713; 364/768
[58] Field of Search ............... 364/713, 768, 784, 837; 350/353, 96.11

[56] References Cited

U.S. PATENT DOCUMENTS

| | | | |
|---|---|---|---|
| 4,042,814 | 8/1977 | Taylor | 364/713 |
| 4,382,660 | 5/1983 | Pratt, Jr. et al. | 350/353 |
| 4,811,258 | 3/1989 | Anderson et al. | 364/713 |
| 4,864,524 | 9/1989 | Guilfoyle et al. | 364/713 |

FOREIGN PATENT DOCUMENTS 58-147083 9/1983 Japan .

OTHER PUBLICATIONS

Takayuki Sugeta et al., "Metal-Semiconductor-Metal Photodetector for High-Speed Optoelectronic Circuits" Proceedings of the 11th Conference (1979 International) on Solid State Devices, Tokyo, 1979; Japanese Journal of Applied Physics, vol. 19 (1980) Supplement 19-1, pp. 459–464.

*Primary Examiner*—Gary V. Harkcom
*Assistant Examiner*—Long T. Nguyen
*Attorney, Agent, or Firm*—Finnegan, Henderson, Farabow, Garrett, and Dunner

[57] ABSTRACT

SUM and CARRY output signals of a first optical half adder are provided to one input terminal of a second optical half adder and an optical latch memory, respectively, and an output signal of the optical latch memory is provided to the other input terminal of the second optical half adder. Input and output of the two optical half adders and optical latch memory are performed through an optical signal. Each optical half adder includes two light-receiving elements each having a symmetrical electrode arrangement in which two Schottky junctions are connected to each other opposite in polarity, and peripheral elements of resistors, a capacitor and an amplifier. The optical latch memory is an optical flip-flop memory in which a high-speed light-receiving element produces an electric signal in response to an input optical signals, and a high-speed light-emitting element produces, in response to the electric signal guided from the light-receiving element, feed-back light to be applied to the light-receiving element and an output optical signal.

8 Claims, 4 Drawing Sheets

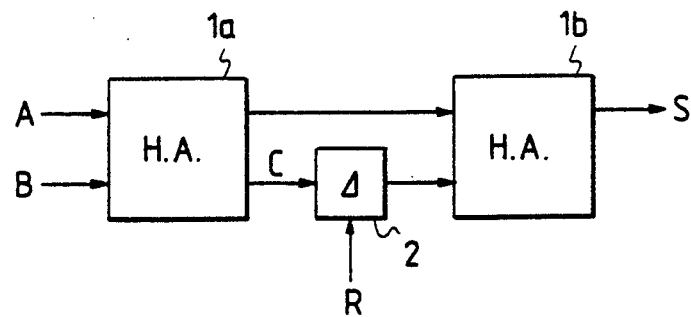
FIG. 1
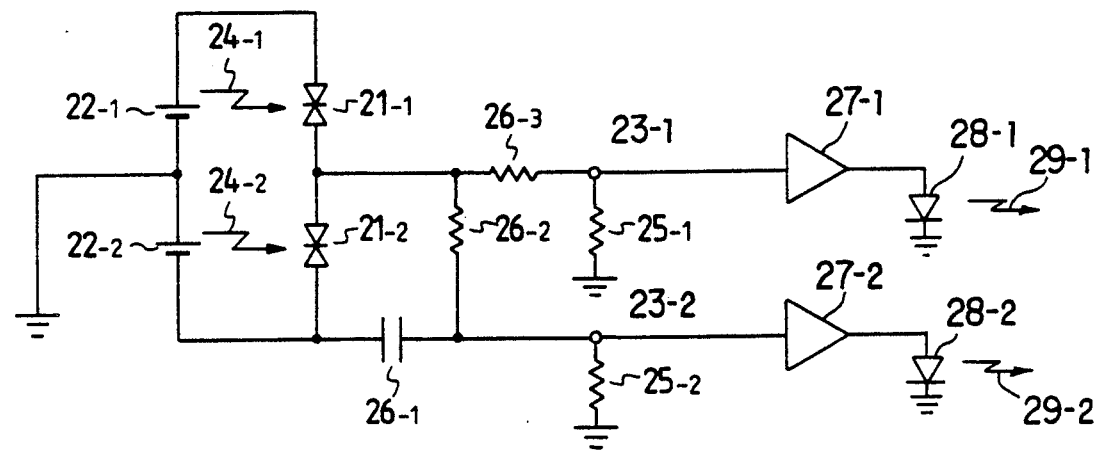
FIG. 2 PRIOR ART
FIG. 4
PRIOR ART
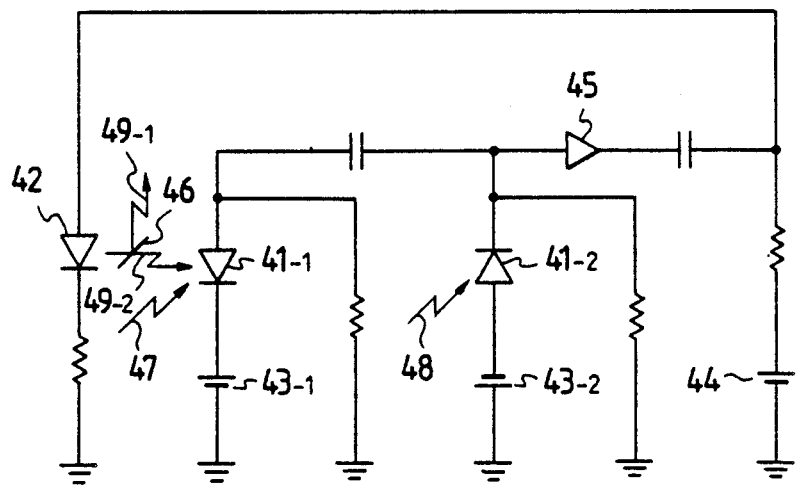

OPTICAL FULL ADDER

BACKGROUND OF THE INVENTION

This invention relates to a full adder for processing N-bit binary numbers, and particularly relates to a full adder the input and output of which are both performed optically.

FIG. 7 shows an example of a prior art parallel full adder, which is composed of a half adder, a plurality of full adders and a serial-parallel converter circuit. Shown by numeral 71 is a half adder in the first stage, 72 is a full adder, and 73 is a serial-parallel converter circuit. Symbols A and B represent input signals, $S_0$, $S_1$ and $S_2$ are output signals, and $C_0$, $C_1$ and $C_2$ are CARRY signals.

FIG. 8 shows an example of a prior art series full adder, which is composed of a full adder 81 and a latch memory 82. Symbols A and B represent input signals, $S_0$, $S_1$ and $S_2$ are output signals, C is a CARRY signal, and R is a reset signal for the latch memory 82.

For performing the function of full addition of N-bit numbers, the parallel type circuit shown in FIG. 7 requires (N−1) full adders 72 and one half adder 71, so the resulting full adder circuit increases in size, requiring complicated wiring. Further, parallel processing of data in separate bits necessitates the use of the circuit 73 for achieving serial to parallel conversion of the input data.

Compared to the parallel full adder circuit of FIG. 7, the series type circuit shown in FIG. 8 has the advantage of simplicity in circuit configuration. On the other hand, the need for repeatedly performing the function of full addition by N times in succession results in very slow computing speed in the case where the full adder is composed of an ordinary electronic circuit.

SUMMARY OF THE INVENTION

An object, therefore, of the present invention is to solve the aforementioned problems of the prior art.

This object of the present invention can be attained by an optical full adder that is composed of two optical half adders and an optical latch memory, the input and output of which components are performed through an optical signal.

In a preferred embodiment, the optical signal input portion of the half adder is composed of two light-receiving elements each having a symmetrical electrode arrangement in which rectifying junctions are connected to each other opposite in polarity, and said light-receiving elements are connected to peripheral elements such as a resistor, a capacitor and an amplifier to obtain the result of the performance of optical half addition.

In another preferred embodiment, the optical latch memory is an optical flip-flop memory in which an electric signal produced by a high-speed light-receiving element at the input portion is converted into an optical signal by a high-speed light-emitting element electrically connected to said light-receiving element. Part of the optical signal is fed back to said light-receiving element, and the other part is output as a CARRY signal whereby the CARRY signal can be transmitted at high speed.

When two binary numbers are fed into the optical half adder in the first stage, with their corresponding bits being supplied concurrently, the SUM output is applied to one input of the optical half adder in the second stage for each bit, whereas the CARRY output is supplied to the optical latch memory. The data stored temporarily in the latch memory is fed to the other input of the half adder in the second stage and added therein to the SUM output of the next bit from the half adder in the first stage. As a result, the sum of the two binary numbers is obtained as the SUM output from the half adder in the second stage.

If each of the optical half adders uses two light-receiving elements of the special construction described above, the result of computation can be output in one clock period, so that these half adders can be connected in series without a substantial compromise in the speed of the performance of full addition

BRIEF DESCRIPTION OF THE DRAWINGS

FIG. 1 is a block diagram showing an example of an optical full adder of the present invention;

FIG. 2 is a circuit diagram showing an example of a half adder circuit used in the present invention;

FIG. 4 is a circuit diagram showing an example of an optical flip-flop circuit used as an optical latch memory in the present invention;

DETAILED DESCRIPTION OF THE PREFERRED EMBODIMENTS

Figures 3, 5:
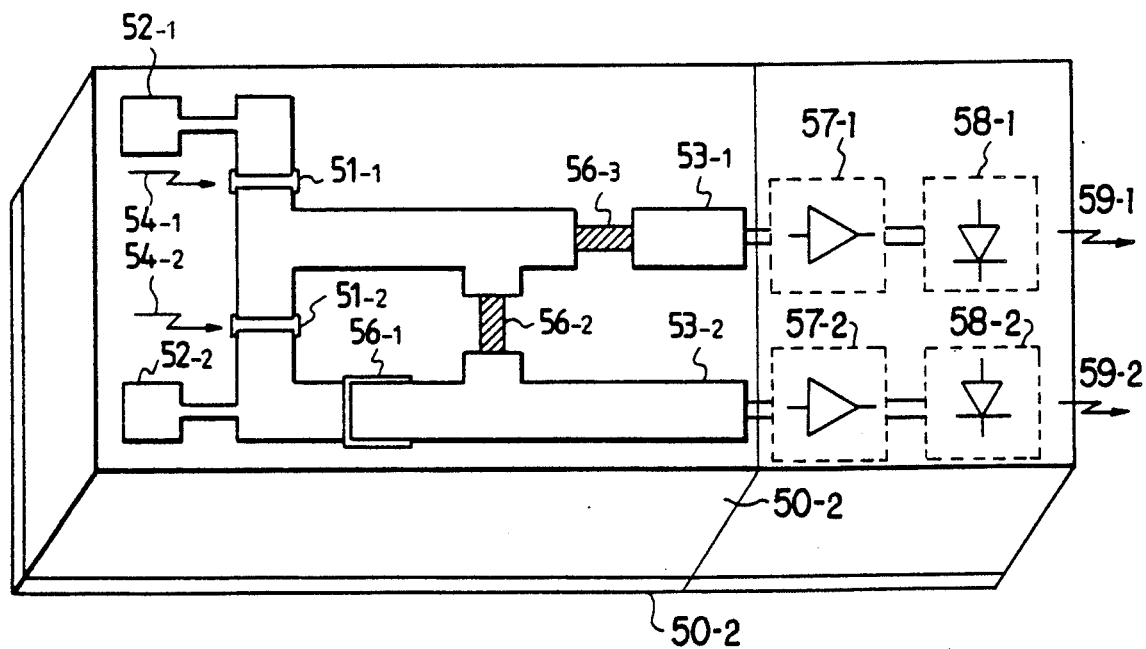
FIG. 3 is the truth table of said half adder.
FIG. 5 is a perspective view of a circuit in which the half adder shown in FIG. 2 is integrated on a semiconductor substrate using striplines.

FIG. 1 is a block diagram showing an example of an optical full adder of the present invention. Shown by numerals 1a and 1b are optical half adders, 2 is an optical latch memory, A and B denote optical input signals, S is an optical output signal, C is a CARRY signal, and R is an optical reset signal for the latch memory 2. The optical full adder of the example under discussion is composed of two optical half adders 1a, 1b the input and output of which are both performed optically, and one optical latch memory 2 that achieves a delay by one clock period. Each of the optical half adders 1a, 1b and the optical latch memory 2 is composed of a circuit which, as described below, performs its input and output operation optically so as to be adapted for high-speed operation. Since data transfer is performed by means of an optical signal, the optical full adder of FIG. 1 is capable of performing the function of full addition at high speed and hence working as a component of an optical computer.

FIG. 2 is a circuit diagram showing an example of an optical half adder circuit that performs the function of half addition in response to optical input signals and that outputs the result of computation in one clock period. This optical half adder is described in U.S. patent application Ser. No. 07/435,739 filed Nov. 14, 1989. In the drawing, 21-1 and 21-2 are input light-receiving elements; 22-1 and 22-2 are power sources for applying a bias voltage to the respective light receiving elements 21-1 and 21-2; 23-1 and 23-2 are electrical output terminals for SUM and CARRY electric signals, respectively; 24-1 and 24-2 are optical input signals; 25-1 and 25-2 are load resistors connected to the output terminals 23-1 and 23-2, respectively; 26-1 is a capacitor; and 26-2 and 26-3 are resistors. The output terminals 23-1 and 23-2 are connected to light-emitting elements 28-1 and 28-2 via amplifying circuits 27-1 and 27-2, respectively. The amplifying circuits 27-1 and 27-2 amplify the output electrical signals from the respective output terminals 23-1 and 23-2 to allow the light-emitting elements 28-1 and 28-2 to generate respective optical output signals 29-1 and 29-2.

The truth table of the circuit shown in FIG. 2 is given in FIG. 3 together with the peak height and polarity of the output waveforms. One-dot chain lines in the drawing represent threshold levels which are properly set, and parenthesized figures denote logic signals.

When none of the light-receiving elements receive the optical pulse signals, no electric signal is output. When only the light-receiving element 21-1 receives the optical pulse signal 24-1, an electric signal positive in polarity is produced at the SUM output terminal 23-1, and at the same time it is supplied to the CARRY output terminal 23-2 through the resistor 26-2. By setting threshold levels as indicated by the one-dot chain lines in FIG. 3, the output logic signal at the SUM output terminal 23-1 becomes "1", and the output logic signal at the CARRY output terminal 23-2 becomes "0".

When only the light-receiving element 21-2 receives the optical pulse signal 24-2, an electric signal negative in polarity is produced at the SUM output terminal 23-1, and at the same time an electric signal positive in polarity is supplied to the CARRY output terminal 23-2. By setting threshold levels as indicated in FIG. 3, the electric signal at the SUM output terminal 23-1 becomes "1" and the electric signal at the CARRY output terminal 23-2 becomes "0".

When the two light-receiving elements receive the optical pulse signals at the same time, the electric signals opposite in polarity at the SUM output terminal 23-1 cancel out each other, as a result of which the output signal at the SUM output terminal 23-1 becomes "0", and the output signal at the CARRY output terminal 23-2 is raised beyond the threshold level to "1" because the signals positive in polarity are superposed to increase the peak value. Circuit constants of the elements 26-1, 26-2 and 26-3 added to the optical half adder of FIG. 2 should be determined with the light-receiving elements 21-1 and 21-2 and impedances cf the loads 25-1 and 25-2 taken into account so that the electric signals generated by the light-receiving elements result in the well-balanced output signals through the logic operation and that the deterioration of the circuit time constant is minimized.

Each of the light-receiving elements 21-1 and 21-2 used in the circuit shown in FIG. 2 may be of a type described in the paper "Metal-Semiconductor-Metal Photodetector for High-Speed Optoelectronic Circuits", proceedings of the 11th Conference on Solid State Devices (1979), pp. 459-464. The light-receiving element of this type consists of two Schottky electrodes formed on a semiconductor substrate with a small gap therebetween, so that the element has two rectifier junctions connected to each other opposite in polarity and a substantially symmetrical electrode arrangement. The surface area of the semiconductor substrate between the two Schottky electrodes acts as a light-receiving surface. Therefore, each of these light-receiving elements 21-1 and 21-2 can be supplied with a bias voltage of either polarity, positive or negative, so that equivalent electric signals corresponding to the polarity of the applied bias voltage will be produced simultaneously from the two electrodes. Another advantage of these light-receiving elements 21-1 and 21-2 is that the dark current which can be a cause of noise is substantially small and that they can operate at high speed. Therefore, it is possible to construct an optical half adder circuit in which the minimum necessary energy for input signal light is small and that is capable of high-speed operation.

FIG. 4 shows an optical flip-flop circuit which is an example of the latch memory providing a delay by one clock period, and in which input and output operations are performed through an optical signal. The optical flip-flop of this type is described in U.S. patent application Ser. No. 07/423,203 filed Oct. 18, 1989. Shown by 41-1 and 41-2 are a setting and a resetting light-receiving elements, respectively; 42 is a light-emitting element for producing an optical output signal and feed-back light; 43-1 and 43-2 are power sources for applying a bias voltage to the light-receiving elements 41-1 and 41-2, respectively; 45 is an amplifier; 46 is a half-mirror; 47 is an optical set input signal; 48 is an optical reset input signal; 49-1 is an optical output signal; and 49-2 is the feed-back light.

The main components of the optical flip-flop circuit shown in FIG. 4 are the setting light-receiving element 41-1, the resetting light-receiving element 41-2, the amplifier 45, and the light-emitting element 42. This flip-flop circuit operates by the principle of optical feedback in that an electric signal generated upon supply of the optical set input signal 47 to the setting light-receiving element 41-1 is fed to the light-emitting element 42 after amplification with the amplifier 45 and the feed-back light is supplied to the setting light-receiving element 41-1 from the light-emitting element 42, whereby the circuit is brought to a set state. Resetting of this circuit is accomplished by supplying the optical reset input signal 48 to the separate resetting light-receiving element 41-2. The optical output signal 49-1 of this flip-flop circuit can be obtained by means of the half-mirror 46 which extracts part of the optical signal 49-2 being supplied from the light-emitting element 42 to the light-receiving elements 41-1. If the light-emitting element and the light-receiving elements used in this circuit are capable of fast operation and highly efficient photoelectric conversion, the circuit can be operated at high speed with an optical input signal of smaller energy.

An optical full adder that features very fast computing speed can be constructed by combining the optical half adder circuits shown in FIG. 2 with the optical flip-flop circuit shown in FIG. 4 through the optical wiring configuration shown in FIG. 1. When two binary numbers are fed into the optical half adder 1a in the first stage, with their corresponding bits being supplied concurrently, the SUM output is applied to one input of the optical half adder 1b in the second stage for each bit, whereas the CARRY output is supplied to the optical latch memory 2. The data stored temporarily in the latch memory 2 is fed to the other input of the half adder 1b and added therein to the SUM output of the next bit from the half adder 1a. As a result, the sum of the two binary numbers is obtained as the SUM output from the half adder 1b. Since the optical half adders are capable of outputting the result of computation in one clock period, the series connection of the two half adders does not seriously deteriorate the speed of the performance of full addition.

The optical half adders and the optical flip-flop circuit can be integrated monolithically on a semiconductor substrate typically made of GaAs or InP, and it is desirable for an overall system composition to connect these components by optical wiring. Further, the propagation path of an electric signal on the integrated circuit can be wired in a traveling-wave form such as in the form of striplines that permit high-speed signal propagation. Thus, a further enhancement of the computing speed can be realized by adopting this wiring method.

Figure 6:
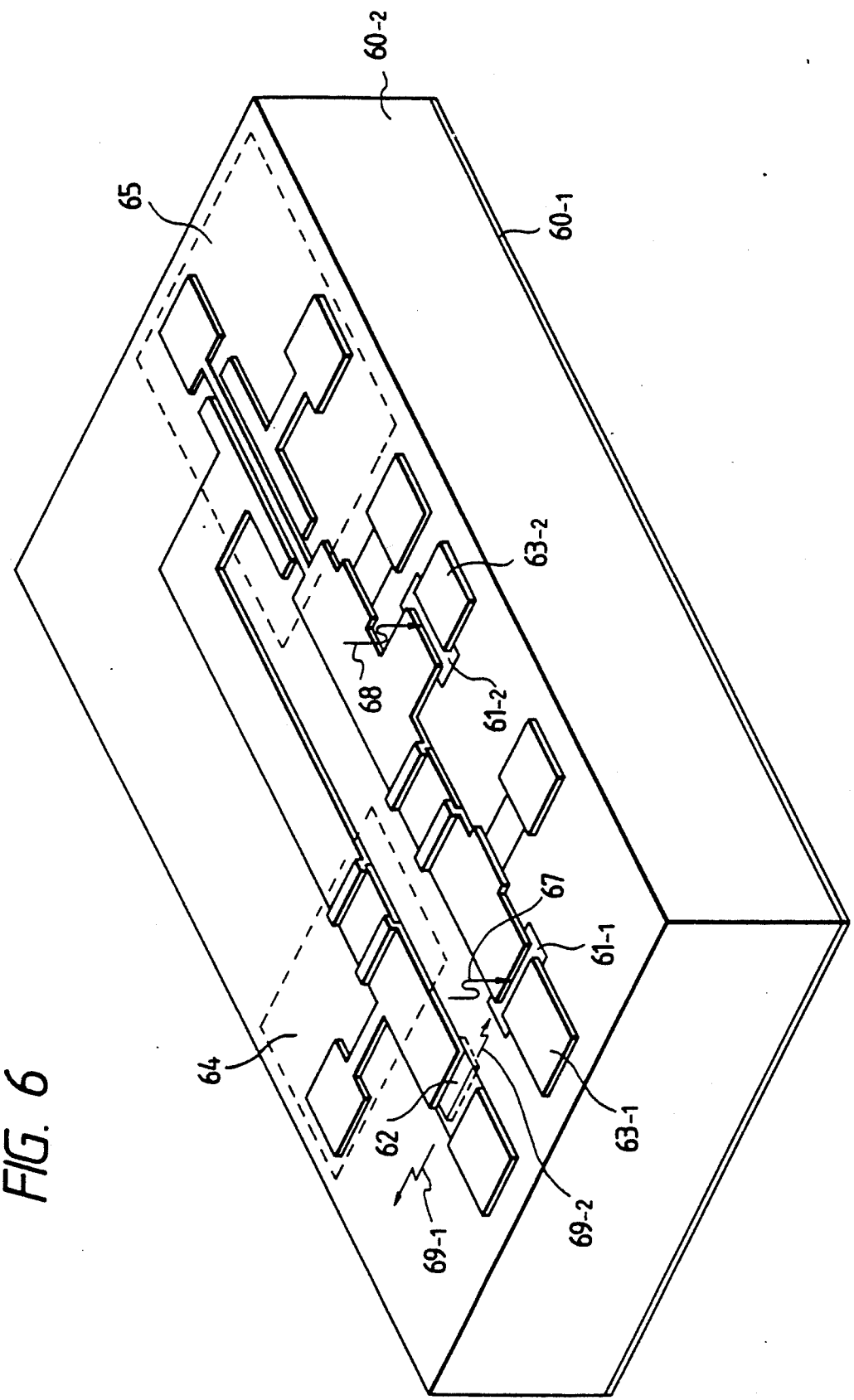
FIG. 6 is a perspective view of a circuit in which the flip-flop circuit shown in FIG. 4 is integrated on a semiconductor substrate using striplines.
Figure 7:
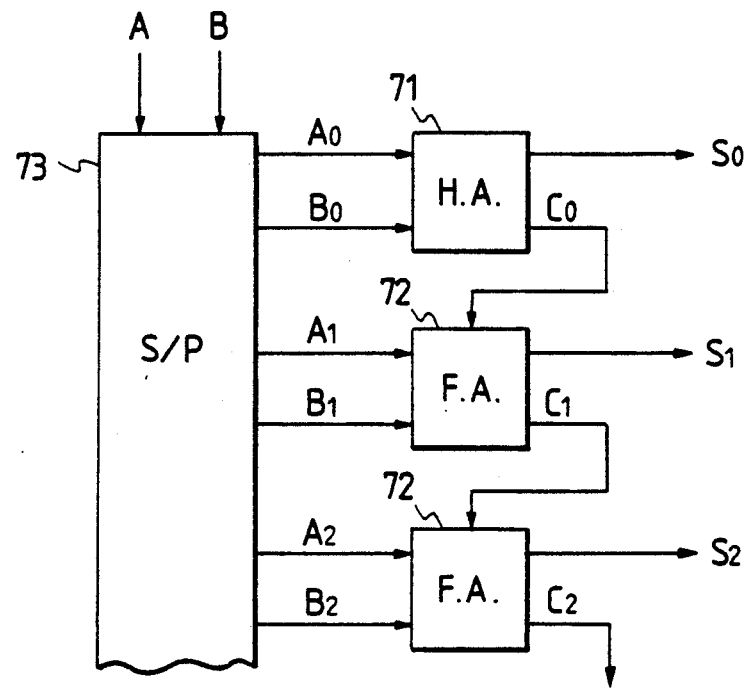
FIG. 7 is a block diagram showing a prior art parallel type full adder circuit.
Figure 8:
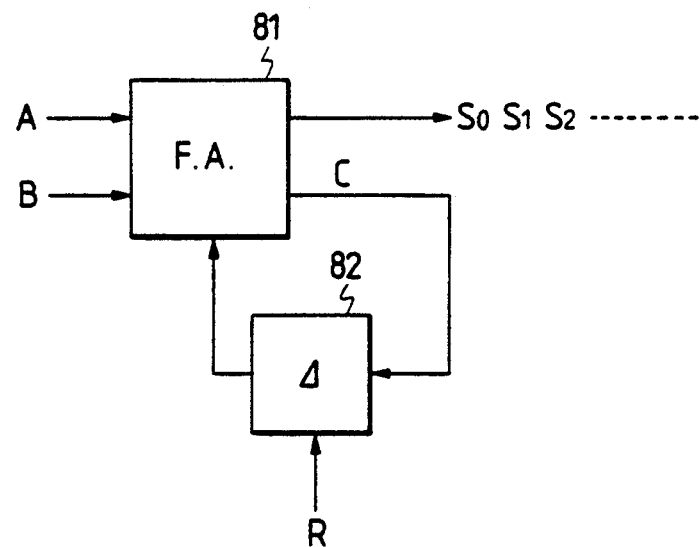
FIG. 8 is a block diagram showing a prior art series type full adder circuit.

FIG. 5 shows an illustrative circuit in which the optical half adder shown in FIG. 2 is integrated in a traveling-wave form, and FIG. 6 shows an illustrative circuit in which the optical flip-flop circuit shown in FIG. 4 is also integrated in a traveling-wave form. Referring to FIG. 5, 51-1 and 51-2 are light-receiving elements; 52-1 and 52-2 are bonding pads to which are connected power sources for supplying a bias voltage to the respective light-receiving elements 51-1 and 51-2; 53-1 and 53-2 are electrical output terminals for SUM and CARRY signals, respectively, which are connected to amplifiers 57-1 and 57-2, and then to light-emitting elements 58-1 and 58-2, respectively; 54-1 and 54-2 represent optical input signals; 56-1 is a capacitor; 56-2 and 56-3 are resistors; 50-1 is a grounded electrode; 50-2 is a semiconductor substrate; and 59-1 and 59-2 are optical output signals. These components respectively correspond to those shown in FIG. 2.

Referring now to FIG. 6, 61-1 and 61-2 are respectively a setting and a resetting light-receiving element; 62 is a light-emitting element for producing an optical output signal and feed-back light; 63-1 and 63-2 are bonding pads to which are connected power sources for applying a bias voltage to the respective light-receiving elements 61-1 and 61-2; 64 is a bias block for supplying a bias current to the light-emitting element 62; 65 is an amplifier formed of an FET; 67 represents an optical set input signal; 68 represents an optical reset input signal; 69-1 represents an optical output signal; 69-2 represents feed-back light; 60-1 is a grounded electrode; and 60-2 is a semiconductor substrate. These components respectively correspond to those shown in FIG. 4.

As will be understood from the foregoing description, the optical full adder of the present invention offers the following advantages: (1) the overall size of the computing circuit can be reduced with accompanying simplicity in wiring, so that the size of integrated computing circuit chips can be particularly reduced to contribute to a higher yield and a lower fabrication cost; (2) the chips fabricated can be interconnected by optical wiring using components that are capable of performing their input and output optically to insure fast operation, and this serves as the means of fully exploiting the fast response characteristics of light in optical wiring that is involved in the efforts to enhance the operating speed of computers.

What is claimed is:

1. An optical full adder for performing full addition of signals representing first and second binary numbers, comprising:
   a first optical half adder and a second optical half adder, each of the first and second optical half adders having at least first and second input terminals and producing at least two output signals, wherein said first input terminal of said first optical half adder receives the signal representing the first binary number and said second input terminal of said first half adder receives the signal representing the second binary number, and wherein a first output signal produced by the first optical half adder is applied to said first input terminal of the second optical half adder; and
   an optical latch memory, the optical latch memory receiving a second output signal produced by the first optical half adder and producing an output signal to be applied to said second input terminal of the second optical half adder; wherein
   the signals representing the first and second binary numbers, and the output signals of the first optical half adder, the second optical half adder and the optical latch memory are optical signals.

2. An optical full adder according to claim 1, wherein each of the first optical half adder and the second optical half adder comprises:
   two input terminals each having a light-receiving element for receiving two optical signals, each of the light-receiving elements having a symmetrical electrode arrangement in which two rectifying junctions are connected to each other, opposite in polarity;
   peripheral elements including resistors, capacitors and amplifiers; wherein
   each of the first optical half adder and the second optical half adder produces a SUM output signal and a CARRY output signal in response to the two optical signals received at the two input terminals, respectively; and wherein
   the optical latch memory temporarily stores the CARRY output signal from the first optical half adder; whereby
   the full addition is performed at high speed, the high speed being compatible with modulation bandwidth pulses of the optical signals applied to the optical full adder.

3. An optical full adder according to claim 1, wherein the optical latch memory is an optical flip-flop memory comprising:
   an input terminal having a light-receiving element for receiving an optical input signal,
   an electric conductor path for guiding an electric signal, converted from the optical signal by the light-receiving element, to a light-emitting element,
   the light-emitting element for producing a feed-back optical signal to be applied to the light-receiving element, and
   an optical output signal produced in response to the electric signal from the conductor path; whereby
   the optical latch memory transmits a CARRY signal from the first optical half adder to the second optical half adder at high speed, the high speed being compatible with modulation bandwidth pulses of the optical signals applied to the optical full adder.

4. An optical full adder according to claim 2, wherein the SUM output signal and the CARRY output signal of the first optical half adder are transmitted to the first input terminal of the second optical half adder and the input terminal of the optical latch memory, respectively, and wherein the output signal of the optical latch memory is transmitted to the second input terminal of the second optical half adder.

5. An optical full adder according to claim 1, wherein each of the first and second optical half adders is integrated on a semiconductor substrate.

6. An optical full adder according to claim 1, wherein the optical latch memory is integrated on a semiconductor substrate.

7. An optical full adder according to claim 1, wherein the optical full adder is integrated on a semiconductor substrate with the first and second optical half adders and the optical latch memory being optically connected with each other.

8. An optical full adder for performing full addition of signals representing first and second binary numbers, comprising:

a first optical half adder for concurrently receiving corresponding bits of signals representing first and second binary numbers in the form of optical signals and for producing a first optical SUM signal and an optical CARRY signal;

an optical latch memory for temporarily storing the optical CARRY signal transmitted from the first optical half adder; and a second optical half adder for optically adding the optical CARRY signal transmitted from the optical latch memory to the first optical SUM signal transmitted from the first optical half adder to produce a second optical SUM signal which is an output signal of the full adder.

* * * * *